(12) United States Patent
Matsuo et al.

(10) Patent No.: US 7,257,838 B2
(45) Date of Patent: Aug. 14, 2007

(54) INFORMATION PROCESSING SYSTEM AND INFORMATION PROCESSING METHOD CAPABLE OF COMMUNICATING WITH IMPERMISSIBLE PROTOCOL

(75) Inventors: Masakatsu Matsuo, Fukuoka (JP); Hiroyuki Tanaka, Kurume (JP); Yasuhiko Nishimuta, Kurume (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 734 days.

(21) Appl. No.: 10/335,338

(22) Filed: Dec. 31, 2002

(65) Prior Publication Data

US 2003/0135763 A1 Jul. 17, 2003

(30) Foreign Application Priority Data

Jan. 17, 2002 (JP) .......................... P. 2002-008398

(51) Int. Cl.
  G06F 21/22 (2006.01)
  G06F 9/40 (2006.01)
  G06F 15/163 (2006.01)

(52) U.S. Cl. .......................................... 726/14; 726/11
(58) Field of Classification Search .................. 726/11, 726/14, 30
See application file for complete search history.

(56) References Cited

U.S. PATENT DOCUMENTS 6,202,081 B1 *  3/2001  Naudus ...................... 709/200
6,487,598 B1 * 11/2002  Valencia ..................... 709/227
2002/0169842 A1 * 11/2002  Christensen et al. ........ 709/206
2002/0194497 A1 * 12/2002  McGuire ..................... 713/201
2003/0172300 A1 *  9/2003  Parry ......................... 713/201
2004/0044758 A1 *  3/2004  Palmer et al. .............. 709/223
2004/0109438 A1 *  6/2004  Chen .......................... 370/352

FOREIGN PATENT DOCUMENTS

JP            11-185121           7/1999

* cited by examiner

*Primary Examiner*—Gilberto Barron
*Assistant Examiner*—Venkat Perungavoor
(74) *Attorney, Agent, or Firm*—Pearne & Gordon LLP

(57) ABSTRACT

An information processing apparatus comprises: a protocol pass-preventing device provided between a data transmission side and a data reception side, for causing only a predetermined protocol to pass through the protocol pass-preventing device; description means provided on the data transmission side, for describing a protocol which cannot pass through the protocol pass-preventing device in a data area of a protocol which can pass through the protocol pass-preventing device; and extraction means provided on the data reception side, for extracting the protocol which cannot pass through the protocol pass-preventing device from the data area of the protocol data which can pass through the protocol pass-preventing device. As a consequence, such an information processing apparatus capable of performing communication by using the impermissible protocol can be provided even in such a case that the information processing apparatus are isolated from each other by the protocol pass-preventing device such as the firewall.

9 Claims, 4 Drawing Sheets

INFORMATION PROCESSING SYSTEM AND INFORMATION PROCESSING METHOD CAPABLE OF COMMUNICATING WITH IMPERMISSIBLE PROTOCOL

BACKGROUND OF THE INVENTION

1. Field of the Invention

The present invention is related to an information processing system containing an information processing apparatus at transmission side, an information processing apparatus at reception side, and a protocol pass-preventing device such as to a firewall which are connected between the transmission-side information processing apparatus and the reception-side information processing apparatus, and also is related to an information processing method executed in this information processing system.

2. Description of the Conventional Art

Normally, no communication can be carried out by using impermissible protocols between information processing apparatus which are isolated from each other by firewalls. Conventionally, there are two methods as methods capable of establishing communications by using impermissible protocols. In a first method, setting of a firewall is changed and thus, an impermissible protocol can pass through information processing apparatus. In other words, this first method corresponds to such a method for setting such that this impermissible protocol is defined as a permissible protocol. The second method corresponds to a method for utilizing IPSec and L2F (Layer2 Forwarding), which are used in VPN (Virtual Private Network). This second method corresponds to such a method for executing encapsulation by using the protocol corresponding to either the second layer (data link layer) or the third layer (network layer) in the OSI (Open Systems Interconnection) 7-layers model.

FIG. 3 is a block diagram for schematically showing a conventional information processing system to which the above-described second method is applied.

In FIG. 3, reference numeral 11 shows a transmission-sided information processing apparatus, reference number 12 represents a transmission-sided VPN apparatus, reference numeral 13 indicates a transmission-sided firewall, and reference numeral 14 represents a reception-sided firewall which is connected via the Internet to the transmission-sided firewall 13. Also, reference numeral 15 indicates a reception-sided VPN apparatus, and reference numeral 16 denotes a reception-sided information processing apparatus.

With reference to the conventional information processing system with employment of such an arrangement, operations thereof will now be explained by using FIG. 4. That is, FIG. 4 is a flow chart for describing process operations of the conventional information processing system shown in FIG. 3.

First, the transmission-sided information processing apparatus 11 produces data to be transmitted (step S21). After the data has been produced, this data is transmitted from the transmission-sided information processing apparatus 11 to the reception-sided information processing apparatus 16 (step S22) When the data passes through the transmission-sided VPN apparatus 12, this transmission-sided VPN apparatus 12 applies the protocol header of either the second layer (data link layer) or the third layer (network layer) of the OSI 7-layer model to the original data produced by the transmission-sided information processing apparatus 11. In the other words, the transmission-sided VPN apparatus 12 performs the encapsulation (step S23). The data to which this protocol header has been applied passes through the transmission-sided firewall 13 (step S24). Also, the data to which this protocol header has been applied passes through the reception-sided firewall 14 (step S25). When the above-described data passes through the reception-sided VPN apparatus 15, this reception-sided VPN apparatus 15 deletes the protocol header from this data, which has been applied by the transmission-sided VPN apparatus 12 at the above-described step S23 (step S26) Then, the reception-sided VPN apparatus 15 transmits such data from which the protocol header has been deleted to the reception-sided information processing apparatus 16 (step S27). In other words, the reception-sided VPN apparatus 15 sends the original data which has been formed by the transmission-sided information processing apparatus 11 to the reception-sided information processing apparatus 16. The reception-sided information processing apparatus 16 receives this transmitted data so as to analyze this transmitted data (step S28).

Even in the case that such a method is used, in order that these encapsulated data may pass through the transmission-sided firewall 13 and the reception-sided firewall 14 in the above-described steps S24 and S25, setting of these firewalls must be previously changed with respect to the transmission-sided firewall 13 and the reception-sided firewall 14. A difference of this method from the first method is to have such a setup that the protocol header is applied to the transmitted data in the step S23, and this protocol header can be deleted therefrom in the step S26. As a consequence, such a feature can be established in which any persons who do not know this setup cannot make up any communication, and thus, this featured setup can compensate for a lack of security which is caused by the above-described change in setting of the firewalls. In other words, this conventional method implies that a reliable relationship can be established among respective networks where information processing apparatus are present.

However, in such a case that while an impermissible protocol is used, a communication is made between information processing apparatus which are isolated from each other by firewalls, if setting of the firewalls is merely changed, then the following problems may occur. That is, security is deteriorated, and also such a cumbersome operation is necessarily required that setting of the firewalls is changed every time the communication is carried out. Also, in the case of the VPN network, there is another problem that a reliable relationship must be previously established between two networks which are isolated from each other by employing firewalls, and such a communication issued from a network where such a reliable relationship could not be established is also interrupted.

In this conventional information processing system and also the conventional information processing method, even in such a case that the information processing apparatus are isolated from each other by the protocol pass-preventing device such as the firewall, there is a request that the communication can be made by employing the impermissible protocol while setting of the protocol pass-preventing device is not changed, but also, a specific reliable relationship is not established between the information processing apparatus which are isolated by the protocol pass-preventing device.

SUMMARY OF THE INVENTION

To satisfy the above-described requirement, the present invention has an object to provide an information processing system capable of making communication by using an impermissible protocol even in such a case that information processing apparatus are isolated from each other by a protocol pass-preventing device such as a firewall, while setting of the protocol pass-preventing device is not changed, but also, a specific reliable relationship is not established between the information processing apparatus which are isolated from each other by the protocol pass-preventing device. Also, the present invention owns another object to provide an information processing method capable of making communication by using an impermissible protocol even in such a case that information processing apparatus are isolated from each other by a protocol pass-preventing device such as a firewall, while setting of the protocol pass-preventing device is not changed, but also, a specific reliable relationship is not established between the information processing apparatus which are isolated from each other by the protocol pass-preventing device.

To achieve above-described objects, an information processing apparatus, according to an aspect of the present invention, is featured by such an information processing apparatus comprising: a protocol pass-preventing device provided between a data transmission side and a data reception side, for causing only a predetermined protocol to pass through the protocol pass-preventing device; writing means provided on the data transmission side, for writing a protocol which cannot pass through the protocol pass-preventing device in a data area of a protocol which can pass through the protocol pass-preventing device; and extraction means provided on the data reception side, for extracting the protocol which cannot pass through the protocol pass-preventing device from the data area of the protocol data which can pass through the protocol pass-preventing device.

As a consequence, such an information processing apparatus capable of performing communication by using the impermissible protocol can be provided even in such a case that the information processing apparatus are isolated from each other by the protocol pass-preventing device such as the firewall, while setting of the protocol pass-preventing device is not changed, but also, a specific reliable relationship is not established between the information processing apparatus which are isolated from each other by the protocol pass-preventing device.

Also, to achieve the above-described objects, an information processing method, according to another aspect of the present invention, is featured by that in such an information processing method executed in an information processing system comprising a transmission-sided information processing apparatus and a reception-sided information processing apparatus connected via a protocol pass-preventing device such as a firewall, the information processing method is comprised of: a forming step for forming an impermissible protocol corresponding to a protocol which cannot pass through said protocol pass-preventing device; a data processing step for processing data of said impermissible protocol; a writing step for writing either said impermissible protocol or said data-processed impermissible protocol in a data area of such a permissible protocol which can pass through said protocol pass-preventing device; a transmission step for transmitting said permissible protocol; a reception step for receiving said permissible protocol; an extraction step for extracting either said impermissible protocol or said data-processed impermissible protocol from the permissible protocol; a restore step for restoring said data-processed impermissible protocol; and an execution step for executing either said extracted impermissible protocol or said restored impermissible protocol in accordance with the procedure of said impermissible protocol.

Accordingly, such an information processing method capable of establishing communication by using the impermissible protocol can be provided even in such a case that the information processing apparatus are isolated from each other by the protocol pass-preventing device such as the firewall, while setting of the protocol pass-preventing device is not changed, but also, a specific reliable relationship is not established between the information processing apparatus which are isolated from each other by the protocol pass-preventing device.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

First Embodiment

Figure 1:
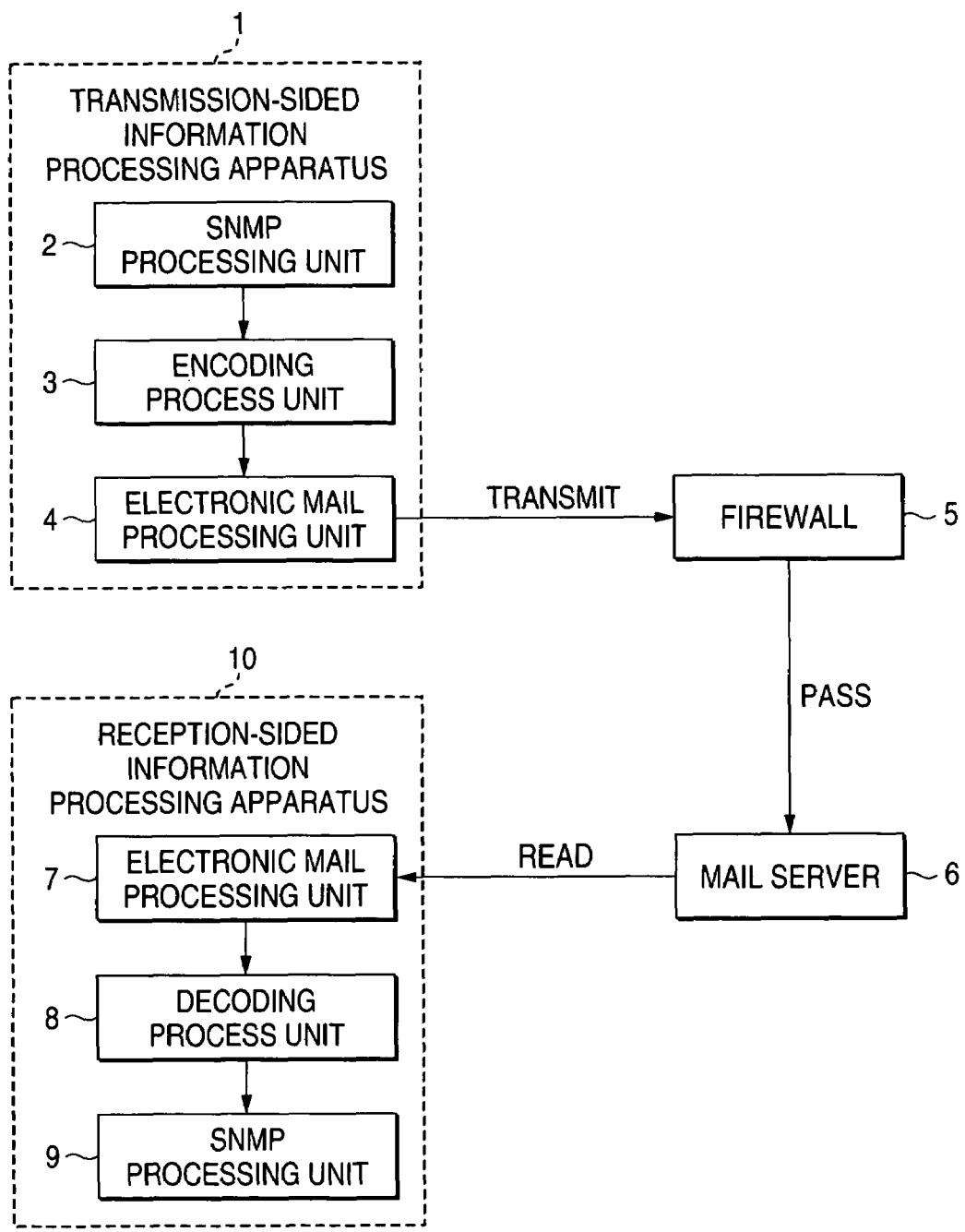
FIG. 1 is a block diagram for schematically indicating an arrangement of an information processing system according to an embodiment mode 1 of the present invention.

In FIG. 1, reference numeral 1 shows a transmission-sided information processing apparatus; reference numeral 2 represents an SNMP (Simple Network Management Protocol) processing unit; reference numeral 3 indicates an encoding process unit for ASCII-processing binary data; reference numeral 4 denotes an electronic mail processing unit for transmitting/receiving an electronic mail; and reference numeral 5 represents a firewall functioning as a protocol pass-preventing device. Also, reference numeral 6 shows a mail server; reference numeral 10 indicates a reception-sided information processing apparatus; reference numeral 7 indicates another electronic mail processing unit for receiving an electronic mail; reference numeral 8 denotes a decoding process unit for decoding ASCII data to binary data; and reference numeral 9 represents another SNMP (Simple Network Management Protocol) processing unit.

Figure 2:
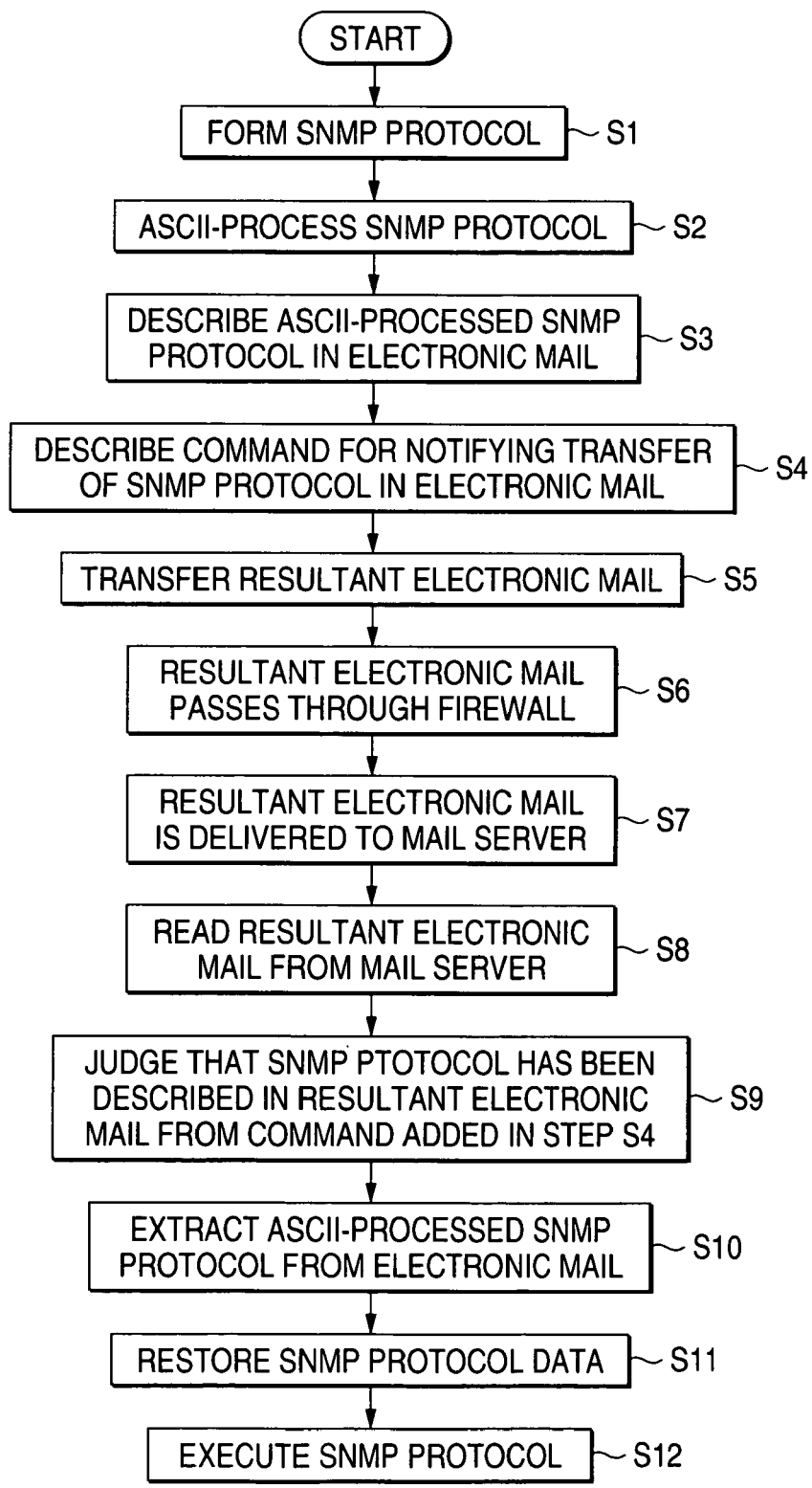
FIG. 2 is a flow chart for describing operations of the information processing system shown in FIG. 1.
Figure 3:
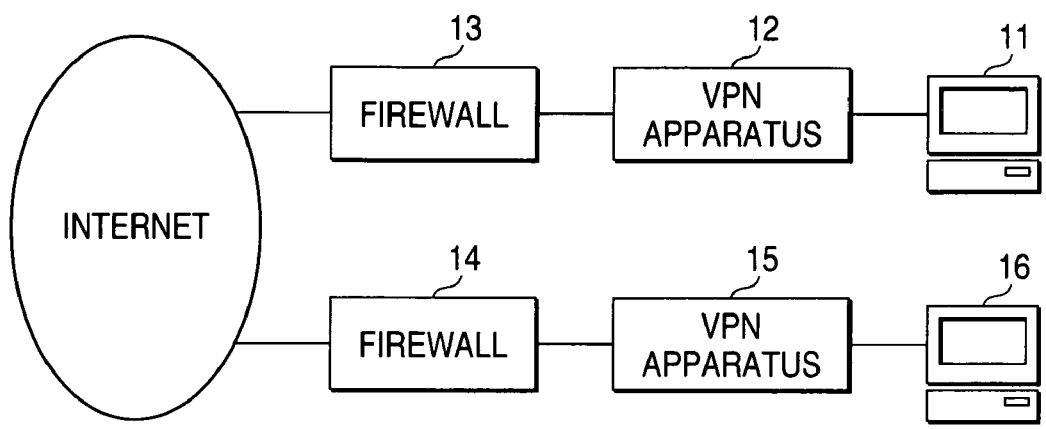
FIG. 3 is a block diagram for schematically representing the arrangement of the conventional information processing system.
Figure 4:
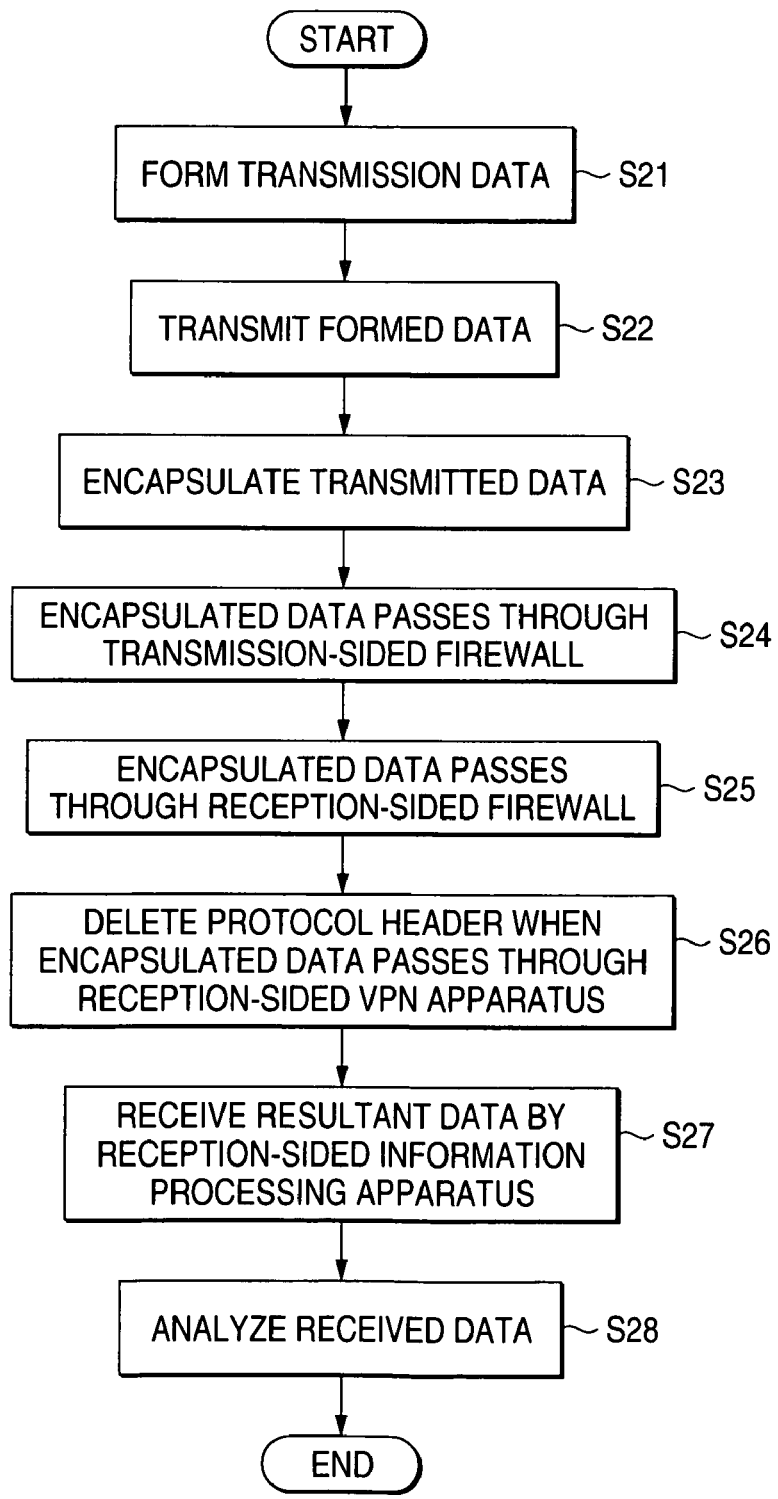
FIG. 4 is a flow chart for explaining the operations of the information processing system shown in FIG. 3.

As to the information processing system with employment of the above-described arrangement according to the embodiment mode 1 of the present invention, operations thereof will now be described with reference to FIG. 2. FIG. 2 is a flow chart for explaining process operations executed in the information processing system of FIG. 1. It should be understood that the process operations executed in this embodiment mode 1 are directed to the following case; namely, in the case that while a permissible protocol of the firewall 5 corresponds to an electronic mail, information of the reception-sided information processing apparatus (reception terminal apparatus) 10 is read or set by using the SNNP protocol from the transmission-sided information processing apparatus 1 to this reception-sided information processing apparatus 10. Furthermore, location where SNMP protocol as impermissible protocol is written (for example, the SNMP protocol is sent and received by way of an attach file), and presence and type of encoding of impermissible protocol (for example, the SNMP protocol is encoded based upon the "BASE64") are predetermined in advance. Operations in such a case that an electronic mail does not always bring the SNMP protocol will be explained. In this embodiment, such a description is made as to whether or not the SNMP protocol is contained in an electronic mail.

In FIG. 2, an SNMP (Simple Network Management Protocol) protocol is formed in the SNMP processing unit 2 (namely, impermissible protocol forming means) (step S1). Next, the SNMP protocol formed in the step S1 is ASCII-processed by using the BASE64 by the encoding process unit 4 (namely, data processing means) (step S2). Next, the SNNP protocol processed in the step S2 is written in a data area of an electronic mail by the electronic mail processing unit (namely, writing means) 4 (step S3). In this embodiment mode 1, this SNMP protocol is written in a previously-determined attach file. Next, such a command for notifying that the electronic mail in which the SNMP protocol has been written is transmitted is described in the data area of the electronic mail processed in the previous step S3 by the electronic mail processing unit 4 (writing means) (step S4). Subsequently, the electronic mail formed in the step S4 is transmitted from the transmission-sided information processing apparatus 1 to the reception-sided information processing apparatus 10 by the electronic mail processing unit 4 (namely, transmission means) (step S5) The electronic mail passes through the firewall 5 (step S6), and then is reached to the mail server 6 (step S7). Next, the electronic mail reached in the step S7 is read out by the electronic mail processing unit 7 (reception means) (step S8) Next, the electronic mail processing unit 7 (reception means) judges that the attach file in which the SNMP protocol has been written is attached to this electronic mail based upon the command added in the step S4 (step S9). Subsequently, the encoded SNNP protocol is extracted from the electronic mail read in the step S8 by the electronic mail processing unit 7 (extraction means) (step S10). Next, the decoding process unit 8 (namely restore means) decodes the encoded SNMP protocol which is extracted in the step S10 (step S11). Finally, the SNMP processing unit 9 (execution means) processes the SNMP protocol decoded in the previous step S11 as the SNMP protocol (step S12).

In the case that a mail is required to be returned, process. operations are carried out in a similar sequential operation (namely, from step S1 to step S12). In such a case that the mail server 6 is provided in front of the firewall 5 in the diagram of FIG. 1, the process operation defined in the step S6 is executed at the same time with respect to the process operation defined in the step S8.

It should be understood that in the above-described embodiment, the attach file of the electronic mail is utilized as the data area indicated in the step S1. Alternatively, a data area of a FTP (File Transfer Protocol) may be used, or the permissible protocol may be extended so as to prepare a data area for a user.

Also, in the case that the permissible protocol processing method is determined in one, or both process operations executed in the transmission-sided information processing apparatus 1 and the reception-sided information processing apparatus 10, and also in such a case that the permissible protocol processing method is changed every permissible protocol, this process method is confirmed before the process operation of the step S10 is executed by employing the electronic mail processing unit 4, the electronic mail processing unit 7, and the decoding process unit 8 in such a manner that this confirmation processing method is performed at the same time with respect to other steps, or is separately carried out in one, or both the process operations executed in both the transmission-sided information processing apparatus 1 and the reception-sided information processing apparatus 10. The above-explained cases may be conceived from such cases that: no decision is previously made as to whether or not the impermissible protocol is data-processed; the data processing method is not previously determined; no decision is previously made as to whether or not the permissible protocol transfers the impermissible protocol; and the location of the impermissible protocol within the permissible protocol is not previously determined.

There are various sorts of confirmation methods as to this processing method confirmation: namely, a method in which the transmission-sided information processing apparatus 1 notifies the processing method to the reception-sided information processing apparatus 10; a method in which the reception-sided information processing apparatus 10 queries the processing method as to the transmission-sided information processing apparatus 1; a method in which the reception-sided information processing apparatus 10 notifies the processing method to the transmission-sided information processing apparatus 1; a method in which the reception-sided information processing apparatus 10 judges the processing method based upon such information obtained from the protocol transmitted in the past; a method in which the reception-sided information processing apparatus 10 judges the processing method based upon the information obtained from the permissible protocol which carries the impermissible protocol; a method in which the reception-sided information processing apparatus 10 judges the processing method based upon the information obtained from such a protocol sent after the permissible protocol which carries the impermissible protocol; and combinations of these methods.

For instance, the below-mentioned methods are provided: a method in which an impermissible protocol is present in a permissible protocol transmitted within a predetermined time period; a method in which an impermissible protocol is present in a certain location within a permissible protocol conducted by a specific calculation formula; a method for finding out either presence or a location of an impermissible protocol by directly using information (namely, transmission time and data length) acquired from a permissible protocol, or based upon a calculation formula; a method for finding out either presence or a location of an impermissible protocol by describing a command and a flag within a permissible protocol; a method in which a sign of a discovery is made by transmitting a predetermined protocol before/after a permissible protocol containing an impermissible protocol is transmitted; and also a method in which a permissible protocol containing an impermissible protocol is transmitted after a sign of a discovery has been made from the reception side.

As a concrete example, there is such a method. That is, the electronic mail processing unit 7 judges as to whether or not an impermissible protocol is present in a permissible protocol, and also investigates as to how the impermissible protocol has been written in the permissible protocol. Also, the decoder processing unit 8 judges as to whether or not the impermissible protocol written in the permissible protocol has been data-processed, and further, investigates as to how the impermissible protocol written in the permissible protocol has been data-processed.

As previously described, in accordance with this embodiment mode 1, the transmission-sided information processing apparatus 1 is provided with: impermissible protocol forming means 2 for forming an impermissible protocol corresponding to a protocol which cannot pass through a protocol pass-preventing device 5; data processing means 3 for processing data of the impermissible protocol; writing means 4 for describing either the impermissible protocol or the data-processed impermissible protocol in a data area of such a permissible protocol which can pass through the protocol pass-preventing device 5; and transmission means 4 for transmitting the permissible protocol. The reception-sided information processing apparatus 10 includes: reception means 7 for receiving the permissible protocol; extraction means 7 for extracting either the impermissible protocol or the data-processed impermissible protocol from the permissible protocol; restore means 8 for restoring the data-processed impermissible protocol; and execution means 9 for executing either the extracted impermissible protocol or the restored impermissible protocol in accordance with the procedure of the impermissible protocol. Thus, either the impermissible protocol or the data-processed impermissible protocol is written in the data area of the permissible protocol which can pass through the protocol pass-preventing device 5 such as the firewall. As a consequence, even in such a case that the information processing apparatus are isolated from each other by a protocol pass-preventing device such as a firewall, a communication can be carried out by using an impermissible protocol, while setting of the protocol pass-preventing device is not changed, but also, a specific reliable relationship is not established between the information processing apparatus which are isolated from each other by the protocol pass-preventing device.

Also, the reception-sided information processing apparatus 10 is provided with: first judgment means 7 for judging as to whether or not the impermissible protocol is present in the permissible protocol; first investigation means 7 for investigating as to whether or not how the impermissible protocol has been written in the permissible-protocol; and second judgment means 8 for judging as to whether or not the impermissible protocol contained in the permissible protocol has been data-processed; or second investigation means 8 for investigating as to how the impermissible protocol contained in the permissible protocol has been data-processed. As a result, the reception-sided information processing apparatus 10 can judge as to whether or not the impermissible protocol is present, can grasp the content written in the impermissible protocol, can judge as to whether or not the impermissible protocol is data-processed, and also can grasp as to how the impermissible protocol has been data-processed, so that this reception-sided information processing apparatus 10 can quickly process the impermissible protocol.

Second Embodiment

An arrangement of an information processing system according to an embodiment mode 2 of the present invention is the same as that of the above-described embodiment mode b 1.

In this embodiment, in an OSI 7-layers model, data of a protocol higher than, or equal to the fourth layer is written in either a data area or an extended area of a protocol higher than, or equal to the fourth layer in a different OSI 7-layers model, and then, the written data of the protocol is transferred. As a result, a feature of such a protocol used in the transfer operation may be utilized in a protocol to be transferred. In other words, the pass function of the permissible protocol is applied with respect to the impermissible protocol in the first embodiment, whereas a function of a protocol to be transferred is extensively transferred with respective to the protocol to be transferred. As a consequence, a feature of the protocol to be transferred maybe applied to the protocol to be transferred.

Concretely speaking, the above-described operations will now be explained with reference to FIG. 1. That is, when the transmission-sided information processing apparatus 1 executes communication based upon the SNMP protocol, corresponding to an one-to-one communication, this transmission-sided information processing apparatus 1 can be simultaneously communicated with a plurality of reception-sided information processing apparatus 10 by utilizing an electronic mail.

As previously explained, in accordance with this embodiment, in either the data area or the extension area of the permissible protocol located in the fourth layer, or higher layers in the OSI 7-layers mode, such a data of the impermissible protocol in the fourth layer, or the higher layers different from either data area or the extension area in the same OSI 7-layers model is written, and then the written data is transferred. As a result, the feature of the protocol to be transferred can be applied to the protocol to be transferred.

It should also be understood that when a protocol is transmitted/received between a transmission side and a reception side while this protocol passes through a firewall, such a problem case that security is deteriorated may occur. This problem may be solved in such a manner that a function capable of prohibiting this protocol transmitting/receiving operation without any restriction may be provided on the reception side.

Alternatively, in the case that an access operation from the transmission side to the reception side is sensed by the reception side, if this fact may be notified to a manager on the reception side by using an electronic mail, or the like, then such a security problem may be solved. Furthermore, an access operation from the transmission side may be allowed only at a specific location, or only in a specific time range.

What is claimed is:
1. An information processing system comprising:
a protocol pass-preventing device provided between a data transmission side and a data reception side, for causing only a predetermined protocol to pass through said protocol pass-preventing device;
a writing section, provided on said data transmission side, for writing a first protocol which cannot pass through said protocol pass-preventing device in a data area of a second protocol which can pass through said protocol pass-preventing device;
an extraction section provided on said data reception side, for extracting said first protocol which cannot pass through said protocol pass-preventing device from said data area of the second protocol which can pass through said protocol pass-preventing device; and
a judgment section for judging as to whether or not said first protocol which cannot pass through said protocol pass-preventing device is present in a data area of said second protocol which can pass through said protocol pass-preventing device is provided on the data reception side, wherein
said transmission side transmits, to said reception side via said protocol pass-preventing device, said second protocol which can pass through said protocol pass-preventing device, the first protocol which cannot pass through said protocol pass-preventing device being written in the data area of the second protocol.

2. The information processing system as claimed in claim 1, wherein: said data area corresponds to a data area of a protocol of the fourth layer or higher layers in the Open System Interconnection 7-layers model.

3. The information processing system as claimed in claim 1, wherein said first protocol comprises the Simple Network Management Protocol.

4. An information processing system comprising a transmission-sided information processing apparatus and a reception-sided information processing apparatus connected via a protocol pass-preventing device, wherein said transmission-sided information includes:
   an impermissible protocol forming section for forming an impermissible protocol which cannot pass through said protocol pass-preventing device;
   a data processing section for processing data of said impermissible protocol;
   a writing section for writing either the impermissible protocol or said data-processed impermissible protocol in a data area of such a permissible protocol which can pass through said protocol pass-preventing device; and
   a transmission section for transmitting the permissible protocol; and wherein
said reception-sided information processing apparatus includes:
   a reception section for receiving said permissible protocol;
   an extraction section for extracting either said impermissible protocol or said data-processed impermissible protocol from the permissible protocol;
   a restore section for restoring the data-processed impermissible protocol;
   an execution section for executing either said extracted impermissible protocol or said restored impermissible protocol in accordance with the procedure of the impermissible protocol;
   a first judgment section for judging as to whether or not said impermissible protocol is present in the permissible protocol;
   a first investigation section for investigating as to whether or not how said impermissible protocol has been written in the permissible protocol;
   a second judgment section for judging as to whether or not said impermissible protocol contained in the permissible protocol has been data-processed; and
   a second investigation section for investigating as to how said impermissible protocol contained in the permissible protocol has been data-processed.

5. An information processing method executed in an information processing system comprising a transmission-sided information processing apparatus and a reception-sided information processing apparatus connected via a protocol pass-preventing device such as a firewall, said information processing method comprising the steps of:
   forming an impermissible protocol corresponding to a protocol which cannot pass through said protocol pass-preventing device;
   processing data of said impermissible protocol;
   writing either said impermissible protocol or said data-processed impermissible protocol in a data area of such a permissible protocol which can pass through said protocol pass-preventing device;
   transmitting said permissible protocol;
   receiving said permissible protocol;
   extracting either said impermissible protocol or said data-processed impermissible protocol from the permissible protocol;
   restoring said data-processed impermissible protocol;
   executing either said extracted impermissible protocol or said restored impermissible protocol in accordance with the procedure of said impermissible protocol;
   previously judging as to whether or not said impermissible protocol is present in said permissible protocol;
   previously investigating as to whether or not said impermissible protocol has been written in the permissible protocol;
   previously judging as to whether or not said impermissible protocol contained in the permissible protocol has been data-processed; and
   previously investigating as to how said impermissible protocol contained in the permissible protocol has been data-processed.

6. The information processing method as claimed in claim 5, wherein data of an impermissible protocol of a fourth layer or higher layers in an OSI (open system interconnection) 7-layers model is written in either a data area or an extension area of a permissible protocol of a fourth layer or higher layers in another OSI 7-layers model, which is different from said data area or said extension area.

7. The information processing method as claimed in claim 5, wherein data of an impermissible protocol of a fourth layer or higher layers in an OSI (open system interconnection) 7-layers model is written in either a data area or an extension area of a permissible protocol of a fourth layer or higher layers in another OSI 7-layers model, which is different from said data area or said extension area.

8. An information processing system comprising:
   a protocol pass-preventing device for causing only a predetermined protocol to pass to and from an external data transmission line;
   a transmission section for transmitting data to the external data transmission line through said protocol pass-preventing device, said transmission section including a writing section for writing a protocol which cannot pass through said protocol pass-preventing device in a data area of a protocol which can pass through said protocol pass-preventing device; and
   a reception section including extraction section provided for extracting said protocol which cannot pass through said protocol pass-preventing device from said data area of the protocol data which can pass through said protocol pass-preventing device, wherein
   said reception section has a judgment section for judging as to whether or not a protocol which cannot pass through said protocol pass-preventing device is present in a data area of a protocol which can pass through said protocol pass-preventing device.

9. The information processing system as claimed in claim 1, where said second protocol comprises an e-mail.

* * * * *